United States Patent [19]
Robinson et al.

[11] Patent Number: 6,031,657
[45] Date of Patent: Feb. 29, 2000

[54] MEMBRANE-ACTUATED CHARGE CONTROLLED MIRROR (CCM) PROJECTION DISPLAY

[75] Inventors: William P. Robinson, Thousand Oaks; Michael J. Little, Woodland Hills; Eric A. Gifford, Newbury Park, all of Calif.

[73] Assignee: MEMSolutions, Inc., Westlake Village, Calif.

[21] Appl. No.: 09/208,041

[22] Filed: Dec. 9, 1998

Related U.S. Application Data

[63] Continuation-in-part of application No. 09/172,613, Oct. 15, 1998, application No. 09/172,612, Oct. 15, 1998, and application No. 09/182,201, Oct. 30, 1998.

[51] Int. Cl.$^7$ .................................................. G02B 26/08
[52] U.S. Cl. .......................... 359/293; 359/223; 345/108; 353/31; 348/771
[58] Field of Search .................................... 359/293, 223; 345/108, 109; 353/30, 31; 348/740, 770, 771, 772

[56] References Cited

U.S. PATENT DOCUMENTS

| | | | |
|---|---|---|---|
| 2,681,380 | 6/1954 | Orthuber | 178/5.4 |
| 2,682,010 | 6/1954 | Orthuber | 315/8 |
| 2,733,501 | 2/1956 | Orthuber et al. | 29/25.17 |
| 3,517,126 | 6/1970 | Yamada et al. | 178/7.5 |
| 3,600,798 | 8/1971 | Lee | 29/592 |
| 3,678,196 | 7/1972 | Roth | 178/7.5 D |

(List continued on next page.)

OTHER PUBLICATIONS

Sang–Gook Kim, et al., "Actuated Mirror Array–A New Chip–based Display Device for the Large Screen Display," SID Asia Display 1998.

S. Newman, et al., "Development of 5.1 Inch Field Emission Display," Motorola Flat Panel Display Division, SID 1998.

Lawrence Dworsky, et al., "Field Emission Display Technology and Applications," Motorola Flat Panel Display Division, SID 1998.

B. Chalamala et al., "FED up with Fat Tubes," IEEE Spectrum, vol. 35, No. 4, pp. 41–51; Apr. 1998.

Robert T. Smith, "Electronics Development for Field–Emission Displays," Society for Information Display, SID 1998.

S.T. deZwart et al., "Basic Principles of a New Thin Flat CRT," SID Digest, pp. 239–242; 1997.

A.R. Knox et al., "A Flat–Panel CRT with a Permanent Magnet Aperture Plate," SID Digest, pp. 251–254; 1997.

E. Yamaguchi, et al., "A 10–in. Surface–Conduction Electron–Emitter Display," SID Digest, pp. 52–55; 1997.

C.J. Spindt et al., "ThinCRT™ Flat–Panel–Display Construction and Operating Characteristics," SID Digest, pp. 99–102; 1998.

J.A. van Raalte, "A New Schlieren Light Valve for Television Projection," Applied Optics vol. 9, No. 10. (Oct. 1970), p. 2225.

R. Noel Thomas et al., "The Mirror–Matrix Tube: A Novel Light Valve for Projection Displays," IEEE Transactions on Electron Devices, vol. ED–22, No. 9, Sep. 1975, p. 765.

*Primary Examiner*—Georgia Epps
*Assistant Examiner*—Margaret Burke
*Attorney, Agent, or Firm*—Fleshner & Kim

[57] ABSTRACT

The present invention provides a Schlieren projection system with a large aperture reflective imager. The combination of a beam-addressed CCM design with flat-panel manufacturing techniques configuration produces a large aperture imager that overcomes the problems of limited deflection range, high beam current, electrostatic instability and limited resolution associated with known electrostatically-actuated micromirror targets. The CCM imager includes a thin insulating membrane that decouples the electron beam from the micromirror array. Decoupling also allows the mirror to be designed to optimize reflectivity, exhibit a higher resonant frequency for better video performance, and be fabricated simultaneously with the hinges. The CCM imager is fabricated using flat-panel manufacturing techniques that are ideally suited to producing large aperture devices at low cost.

33 Claims, 7 Drawing Sheets

U.S. PATENT DOCUMENTS

| | | | |
|---|---|---|---|
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378 |
| 4,387,964 | 6/1983 | Arrazola et al. | 350/331 R |
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitwood et al. | 428/1 |
| 4,786,149 | 11/1988 | Hoenig et al. | 350/356 |
| 4,805,038 | 2/1989 | Seligson | 358/296 |
| 4,826,293 | 5/1989 | Grinberg et al. | 350/331 R |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,085,497 | 2/1992 | Um et al. | 359/848 |
| 5,142,405 | 8/1992 | Hornbeck | 359/226 |
| 5,172,262 | 12/1992 | Hornbeck | 359/223 |
| 5,196,767 | 3/1993 | Leard et al. | 315/349 |
| 5,231,388 | 7/1993 | Stoltz | 340/783 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,447,110 | 9/1995 | Smith et al. | 315/169.3 |
| 5,448,314 | 9/1995 | Heimbuch et al. | 348/743 |
| 5,452,024 | 9/1995 | Sampsell | 348/755 |
| 5,471,341 | 11/1995 | Warde et al. | 359/293 |
| 5,486,881 | 1/1996 | Hwang | 353/34 |
| 5,493,439 | 2/1996 | Engle | 359/292 |
| 5,504,614 | 4/1996 | Webb et al. | 359/223 |
| 5,504,629 | 4/1996 | Lim | 359/850 |
| 5,508,738 | 4/1996 | Janssen et al. | 348/196 |
| 5,535,047 | 7/1996 | Hornbeck | 359/295 |
| 5,552,925 | 9/1996 | Worley | 359/230 |
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,610,478 | 3/1997 | Kato et al. | 315/169.1 |
| 5,612,753 | 3/1997 | Poradish et al. | 348/743 |
| 5,631,782 | 5/1997 | Smith et al. | 359/871 |
| 5,636,070 | 6/1997 | Ji et al. | 359/855 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,689,278 | 11/1997 | Barker et al. | 345/74 |
| 5,706,061 | 1/1998 | Marshall et al. | 348/743 |
| 5,768,009 | 6/1998 | Little | 359/293 |
| 5,774,196 | 6/1998 | Marshall | 348/743 |
| 5,822,110 | 10/1998 | Dabbaj | 359/293 |

MEMBRANE-ACTUATED CHARGE CONTROLLED MIRROR (CCM) PROJECTION DISPLAY

RELATED APPLICATION

This is a continuation-in-part of co-pending applications Ser. Nos. 09/172,613 filed Oct. 15, 1998 entitled "Membrane-Actuated Charge Controlled Mirror"; 09/172,612 filed Oct. 15, 1998 entitled "Field Emission Charge Controlled Mirror (FEA-CCM)"; and 09/182,201 filed Oct. 30, 1998 entitled "Method of Manufacturing a Microelectromechanical System (MEMS) Charge Controlled Mirror (CCM) on a Large Area Flat-Panel Line", which are hereby incorporated by reference.

BACKGROUND OF THE INVENTION

1. Field of the Invention

This invention relates to projection displays and more specifically to a beam-addressed charge controlled mirror (CCM) projection display.

2. Description of the Related Art

The display market, which includes business projectors, television and portable displays has and continues to grow into a multibillion-dollar business. Display technologies are judged by the marketplace based on performance and cost. The key performance criteria for displays are brightness, contrast ratio, resolution, uniformity, and optical efficiency. Display cost can be broken down into the capital equipment costs, materials, processing time and yield. The market for a low cost, very bright projection display that is scalable to DTV resolutions is enormous.

One class of displays use electrostatically-actuated light modulators in which a beam of light is directed towards a light valve target that, in response to a video addressing signal, imparts a modulation onto the beam in proportion to the amplitude of the deflection of the individual reflective elements, e.g. a reflective thin-film or an array of micromirrors. The amplitude or phase modulated beam is then passed through projection optics to form the image. The target produces attractive electrostatic forces between the underlying substrate and the individual reflective elements that pull them inward toward the substrate. The amplitude of deflection corresponds to the pixel intensity in the video signal. It is well known that optical performance of the light modulator is closely tied to deflection range, electrostatic instability, resolution and aperture size.

Deflection range is strictly limited by the spacing of the reflective elements above the substrate. Furthermore, it is commonly understood that only about one-third of the gap can be usefully employed due to problems of electrostatic instability. The attractive forces tend to overwhelm the restoring spring force of the reflective element, causing it to snap all the way to the base electrode. This problem is commonly referred to as pull-in or snap-over. Once the element snaps over, it remains stuck to the substrate due to the Van der Waals forces. The useful range can be extended to about four-fifths of the gap by using a control electrode underneath the element whose diagonal is about 60% of the length of the element's diagonal. However, this does increase the voltage required to achieve the same amount of deflection.

In the late 1960s, RCA developed a new Schlieren light valve that used a high energy scanning electron beam in a vacuum to address a thin metal film supported in close proximity to a glass substrate, which is described in J. A. van Raalte, "A New Schlieren Light Valve for Television Projection", *Applied Optics* Vol. 9, No. 10, (Oct. 1970), p. 2225. The electron beam penetrates the metal film and deposits charge on the substrate in proportion to the intensity of the video signal. The deposited charge produces an attractive force that deforms the metal film inward towards the substrate, which causes a portion of the reflected light to miss the stop, thereby increasing screen brightness until eventually all the light reaches the screen. In actual operation, each pixel deforms parabolically. Consequently, light incident on the central portion of each pixel element is not deflected, which limits fill factor and optical efficiency. In addition, deflection range is limited to about 20% to maintain parabolic deformation.

Erasure is achieved by bleeding off the charge deposited in the dielectric layer through the faceplate of the vidicon tube. The faceplate's RC time constant can be set to insure that substantially all of the deposited charge is bled off in one frame time. However, the faceplate must be heated in order to minimize the variation in discharge times created by the traps in the dielectric material. In addition, the glass substrate will, over time, tend to discolor in response to the electron bombardment.

More recently Optron Systems, Inc., as described in Warde et al., U.S. Pat. No. 5,287,215, has developed a membrane light modulation system in which a charge transfer plate (CTP) couples charge from a scanning electron gun under vacuum through to potential wells in atmosphere. An array of insulating posts formed in or on the CTP support a deformable reflecting membrane that spans the wells. The CTP serves as a high-density multi-feedthrough vacuum-to-air interface that both decouples the electron beam interaction from the membrane and provides the structural support required to hold off atmospheric pressure. The vacuum-to-air interface allows the reflective membrane to be built and operated in air rather than a vacuum, which is simpler and cheaper.

However, because the CTP provides structural integrity sufficient to withstand atmospheric pressure, the CTP must be very thick, at least 3 mm for useful display sizes. In order to preserve the resolution of the deposited charge pattern, the rule-of-thumb is that the charge plane should be preferably within one-tenth the width of the pixel and no greater than ten times the width. At large distances, the fringing forces will washout the resolution of the attractive electrostatic forces. Even assuming a fairly large pixel size of 0.1 mm the charge plane could be no greater than 1 mm away and preferably about 10 microns. To effectively move the charge plane closer to the membrane, Warde forms conductive feedthroughs in the CTP to transfer the charge pattern from the backside of the CTP to the wells, which are nominally spaced 2–10 microns from the membrane.

Although the feedthroughs solve the proximity problem they dramatically reduce the amount of charge delivered to the wells. Since charge distributes itself uniformly around the cylindrical feedthrough and the area of one end of a feedthrough might be $\frac{1}{1000}$ its total surface area for these dimensions, the amount of charge delivered to the well is reduced by approximately $\frac{1}{1000}$. Thus, the scanning electron gun has to deliver approximately 1000 times the charge needed to actuate the membrane. The higher the current density the larger the beam spot size, hence the lower the resolution of the display.

In the early 1970s, Westinghouse Electric Corporation developed an electron gun addressed cantilever beam deformable mirror device for use in Schlieren projection display, which is described in R. Thomas et al., "The Mirror-Matrix Tube: A Novel Light Valve for Projection Displays," *ED*-22 *IEEE Tran. Elec. Dev.* 765 (1975) and U.S. Pat. Nos. 3,746,310, 3,886,310 and 3,896,338. The device is fabricated by growing a thermal silicon dioxide layer on a silicon-on-sapphire substrate. The oxide is patterned in a cloverleaf array of four centrally joined cantilever beams. The silicon is isotopically wet-etched until the oxide is undercut, leaving four oxide cantilever beams within each pixel supported by a central silicon support post. The cloverleaf array is then metallized with aluminum for reflectivity. The aluminum deposited on the sapphire substrate forms a reference grid electrode near the edges of the mirrors that is held at a d.c. bias. A field mesh is supported above the mirrors to collect any secondary electrons that are emitted from the mirrors in response to the incident primary electrons.

The device is addressed by a low energy scanning electron beam that deposits a charge pattern on the cloverleaf beams, causing the beams to be deformed toward the reference grid electrode on the substrate by electrostatic actuation. Erasure is achieved by holding the deposited charge on the mirror throughout the frame time and then raising the target voltage to equal the field mesh potential while flooding the tube with low energy electrons to simultaneously erase all of the mirrors. This approach increases the modulator's contrast ratio but produces "flicker", which is unacceptable in video applications.

To allow deformation of the cloverleaf beams with reasonable amounts of charge deposited by the scanning electron beam, Westinghouse must make the cloverleaf beams thin and pliable. Also, in order to avoid a crystal grain structure that would reduce reflectivity by 10–15%, Westinghouse must use a very thin aluminum coating on the cloverleaf beams. As a result, the electron beam energy must be relatively low so that substantially all of the electrons are stopped in the mirror and do not penetrate through to the underlying glass substrate. Unfortunately, low energy beams exhibit relatively large spot sizes, which reduces resolution.

A thicker mirror could be used in combination with a high-energy electron beam to stop the incident electrons and maintain high resolution. However, to ensure quality video performance, the fundamental mechanical resonance of the mirror must exceed the video rate by approximately a factor of one hundred to allow the mirror to be fully settled. Resonance frequencies of 5–10 kHz are suitable. As a result the hinge formed at the juncture of the cloverleaf beams and support post would have to be fairly strong, i.e. thick. Since, the spring force of the hinge, which opposes the deflection of the beam increases as the cube of its thickness a lot more charge would have be deposited on the beam to produce adequate force. Electron guns capable of delivering sufficient current in a one-pixel dwell time with a small spot size are currently beyond the state of the art.

The persistent snap-over problems and limited contrast ratio has, to date, kept micromirror light modulators from exploiting their inherent optical power advantages over CRT, liquid crystal and reflective membrane based technologies and dominating the market. In fact, the problem has been so onerous that the light modulator industry has invested considerable time and money to develop a digital mode of operation for these attractive-mode devices and alternate actuation technologies.

Texas Instruments has pioneered the development of the digital-mode light modulator with its digital micromirror device (DMD) that uses the pull-in problem to its advantage. The DMD employs a torsional micromirror that rocks back-and-forth between binary positions with the tips of the mirror being pulled down to the base electrodes. The "sticking" effect is diminished, but not eliminated, by only touching the tip of the mirror to the base electrode and by using anti-stick coatings. Time division multiplexing (TDM), created by rapidly rocking the mirror back-and-forth between its two positions, is used to establish different gray-levels. The electronics for implementing a TDM addressing scheme are much more complex and expensive than those required for analog modulation. Unlike a Schlieren system, the light reflected from the DMD is magnified by a projection lens for direct viewing.

Unfortunately the DMD devices are fairly small, 1.3", which contributes to poor efficiency from the effects of geometrical extent, or "étendue." This loss is due to the deficiency in collecting all the light from the source, which is related to size of an arc lamp with respect to the size of the imager. Simply put, small aperture imagers do not collect light efficiently. Because of the various losses, less than 3% of the light energy reaches the screen in a typical DMD projector. The rest dissipates in heat.

Aura Systems has developed a micromirror light valve target in which electrostatic actuation has been replaced with piezoelectric actuation. The micromirrors are formed on top of piezoelectric pedestals. DC voltages are applied to the pedestals, which causes them to change shape and tilt the mirrors. Although piezoelectric actuation avoids pull-in, the fabrication process is complex and expensive, the deflection angles are small, and high voltages switched at high frequencies are required to actuate the pedestal.

SUMMARY OF THE INVENTION

In view of the above problems, the present invention provides a very bright, low cost projection display.

This is accomplished by incorporating a large aperture reflective imager into a Schlieren optical system. The large aperture imager enables the use of arc lamps with larger source sizes, which increases lifetime and reduces cost The large aperture imager is achieved through a unique combination of design and manufacturing techniques.

The CCM imager includes a thin insulating membrane that is inserted into a vacuum cell to decouple the addressing electron beam from a micromirror array held at reference potential. The membrane is just thick enough to stop the incident electrons from penetrating through to the mirrors but is thin enough that the fringing fields are minimized and do not affect resolution. In fact the membrane is so thin that it cannot support itself against the applied electric field due to the induced charge pattern and must be supported by an array of insulating posts. Decoupling the micromirrors from the beam allows them to be thinner, which in turn reduces the hinge thickness required to maintain adequate resonant frequencies, which in turn reduces the amount of beam current required to deflect the micromirror. At high resolutions, the beam dwell time is very short so charge efficiency is very important.

In a preferred embodiment, an equipotential layer that supports the array shields the mirrors from accumulated static charge and prevents any attractive force from being developed that may otherwise cause the mirror to snap-over and become stuck to the substrate. In addition, an array of attractor pads can be formed on the membrane to improve the resolution of the overall electric field and improve the field uniformity seen by each micromirror. Limited deflection range is overcome by defining an attractor pad geometry that allows greater than 83% of the mirror-to-membrane spacing to be used.

The CCM imager is fabricated using large area flat panel manufacturing equipment, which is ideally suited to high volume, low cost manufacturing, along with traditional MEMS techniques. The use of flat-panel manufacturing techniques is facilitated by eliminating the microelectronics used in DMDs and replacing them with a beam-addressed imager. The technical demands of the micromirror design are such that they do not require leading edge processing equipment. Lower cost equipment that is one or two generations old relative to the state of the art will meet the technical requirements. Lower cost materials will also meet the technical requirements. At the completion of the MEMS processing, the glass panel is diced into individual CCMs. Thereafter, the individual CCMs are released leaving a free-standing device on a glass substrate. This CCM faceplate is then sealed to the vacuum cell that houses the electron beam source, e.g. a CRT or flat-panel source. This unique combination of MEMS processing on a flat-panel line produces displays that have several times the price performance of competing imagers, specifically DMD displays.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a Schlieren projection system with a large aperture reflective imager. The combination of a beam-addressed CCM design with flat-panel manufacturing techniques configuration produces a large aperture imager that overcomes the problems of limited deflection range, high beam current, electrostatic instability and limited resolution associated with known electrostatically-actuated micromirror targets. The CCM imager includes a thin insulating membrane that decouples the electron beam from the micromirror array. Decoupling also allows the mirror to be designed to optimize reflectivity, exhibit a higher resonant frequency for better video performance, and be fabricated simultaneously with the hinges. The electron beam source can be a single electron gun, a pair of electron guns or a fixed beam array such as a field emitter array (FEA), a Thin CRT, a surface conduction electron (SCE) array or a metal-insulator-metal (MIM) cathode array. The CCM imager is fabricated using flat-panel manufacturing techniques that are ideally suited to producing large aperture devices at low cost.

Figure 1:
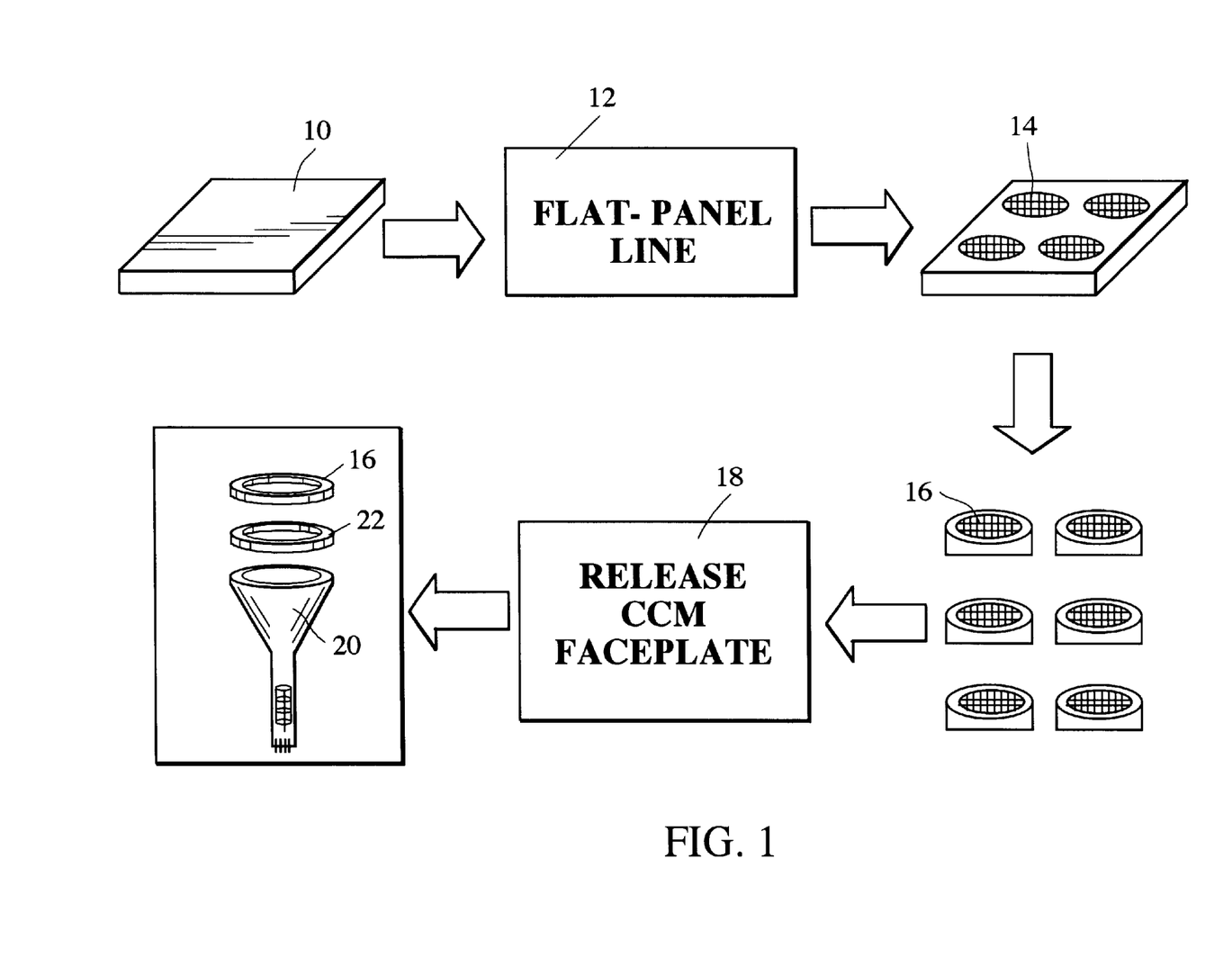
FIG. 1 is a flow diagram in which MEMS fabrication techniques are used in conjunction with an AMLCD lines to manufacture a CCM faceplate in accordance with the present invention.

As shown in FIG. 1, Step 1 of the process flow starts with a large area glass panel 10, suitably 270 square inches or more, which is processed on a flat-panel line 12 such as an AMLCD, STN, FED or Organic LED line using standard large area tools in combination with MEMS photolithography. This combination of large area tools and MEMS lithography defines a number of membrane-actuated micromirror structures 14 on glass panel 10. The panel is then diced into individual CCM faceplates 16. Lastly, the micromirror and membrane structures are released (step 18) by removing the release layers patterned during MEMS lithography. In Step 2 of the process flow, the CCM faceplate 16 is joined and sealed to the vacuum cell 20 that houses the electron beam source, e.g. a CRT or flat-panel source such as a field emitter array (FEA), using a seal preform 22.

Using relatively coarse lithography, relatively few mask levels, and large area processing tools, several microactuator arrays each with over a million mirrors per array can be produced simultaneously on a large glass panels, e.g. 470 mm by 370 mm. These simple structures can be built with high yield at a very low cost compared to standard MEMS fabrication. For example, a CCM faceplate with UXGA resolution (1600×1200) is believed to be too expensive for use in consumer products when fabricated on conventional silicon integrated circuit processing lines whereas the same faceplate is estimated to cost one-fifth to one-tenth as much when fabricated on a large area glass panel using second generation equipment. Although more expensive, CCM faceplates with DTV resolutions (1920×1080) or above can be produced cost effectively for consumer applications using the described process.

More specifically, the CCM is preferably fabricated using processing equipment found in AMLCD flat panel display manufacturing. This equipment is ideally suited to high volume, low cost manufacturing. The technical demands of the micromirror design are such that they do not require leading edge processing equipment. The production equipment needed to complete Step 1 includes conventional photolithography equipment, conventional thin film deposition equipment and conventional etching equipment. Lower cost equipment that is one or two generations old relative to the state of the art will meet the technical requirements. The production equipment needed for Step 2, while not unusual, is specialized. A vacuum assembly and sealing station must be designed to bring the three elements (CCM faceplate, seal perform and the vacuum) into the vacuum chamber, align them together with moderate precision and then heat the assembly to form the seal.

Materials costs are reduced in several ways. First, the relatively few mask levels reduces the amount of materials used and improves yield by reducing the total processing steps. Second, because active microelectronics are not being fabricated on the glass panel, ion migration is not a problem. Therefore, less expensive glass panels that have measurable ion content, e.g. 1% by weight, can be used. In addition, the expensive, slow growing release layer materials such as $SiO_2$ that must be used to withstand the high processing temperatures associated with fabricating the microelectronics can be replaced with inexpensive polymer materials such as PMMA or polyimide that can be spun onto the glass panel.

Figure 2A:
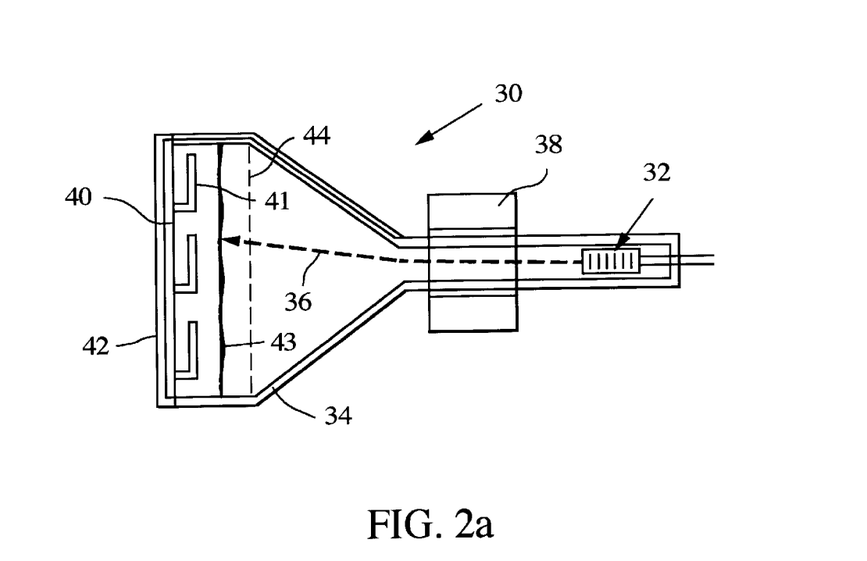
FIGS. 2a and 2b are perspective views of a CRT-CCM and a Thin CCM projection display faceplates, respectively.
Figure 2B:
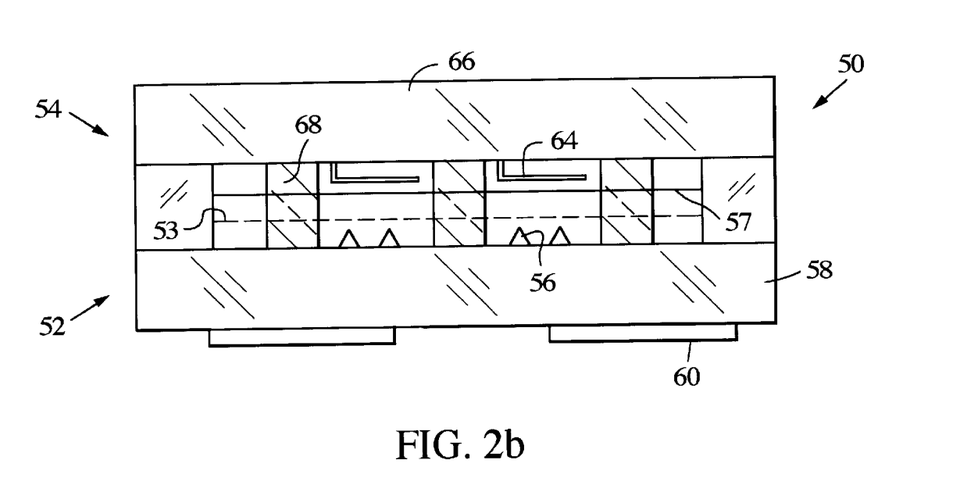

Examples of projection display CCM imagers are illustrated in FIGS. 2a and 2b, respectively. As shown in FIG. 2a, a CRT-CCM imager 30 represents a joining of two technologies: electron beam addressing and an optical modulating layer called a micromirror array. Electron beam addressing is the method used in CRTs and is a well proven technology. An electron gun 32 mounted inside a funnel shaped glass vacuum bottle 34 produces an intensity-modulated beam 36 of electrons. A yoke 38 deflects the beam in a regular zigzag fashion, impinging each point on a CCM faceplate 40.

The CCM faceplate is the main difference between the CRT-CCM and a conventional CRT. In a conventional CRT the electrons hit a phosphor coating that produces light. In the CCM-CRT, the faceplate contains an array of tiny micromirrors 41 formed on a glass substrate 42 that are activated by the electrons. The problems of limited deflection range, high beam currents, eletrostatic instability and limited resolution associated with known electrostatically-actuated imagers are overcome by inserting a thin insulating membrane 43 between the mirror array and the electron gun. The incident electrons eject a number of secondary electrons from membrane 43 that are collected by a positively biased collector grid 44. The net charge pattern on the membrane modulates the potential difference between each of the micromirrors and the membrane, which in turn produces an electrostatic force that deflects the micromirrors. The number of electrons that address any particular localized region on the membrane above the micromirror cells in the array determines the deflection angle and thus how much of the light incident on that mirror will be reflected for projection to the viewing screen.

As shown in FIG. 2b, a vacuum packaged Thin-CCM image 50 marries a flat-panel source technology such as a field emitter array (FEA) 52 with a CCM faceplate 54. FEA 52 is composed of row and column conductors separated by an insulating layer with interspersed field emitter tips 56 on an insulating substrate 58, such as glass. Drive electronics 60 scan the rows sequentially from top to bottom. As each row is selected, the columns are driven to modulate the current in the pixels of the selected row and thereby control the electron emission from tips 56. The emitted electrons are focused and accelerated to strike a thin insulating membrane 57 that decouples CCM 54 from FEA 52 thereby ejecting secondary electrons, which are collected by a collector grid 53. The controlled modulation of flat-panel electron source 52 combined with the collection of secondary electrons forms a charge pattern on membrane 57 that produces attractive electrostatic forces that deflect an array of cantilevered micromirrors 64 formed on front glass 66.

The CCM and flat-panel source are fabricated using highly compatible thin-film semiconductor practices. The flat-panel source and CCM are aligned and bonded together. If not bonded in a vacuum chamber, a pump out tube (not shown) in the rear glass penetrates the cavity. Once assembled, the cavity is pumped out at temperature and the tube sealed off to establish a vacuum similar to a CRT. Insulating spacers 68 support the flat-panel source and CCM against the atmospheric pressures. Although not shown to scale, the Thin-CCM is a very thin device. The flat-panel and CCM substrates are suitably 1–2 mm thick, the substrate-to-mirror and mirror-to-grid spacings are on the order of 10–20 microns apiece, and the collector grid-to-flat panel spacing is approximately 2 microns. The posts or spacers may have a 2 or 3:1 aspect ratio.

Figure 3:
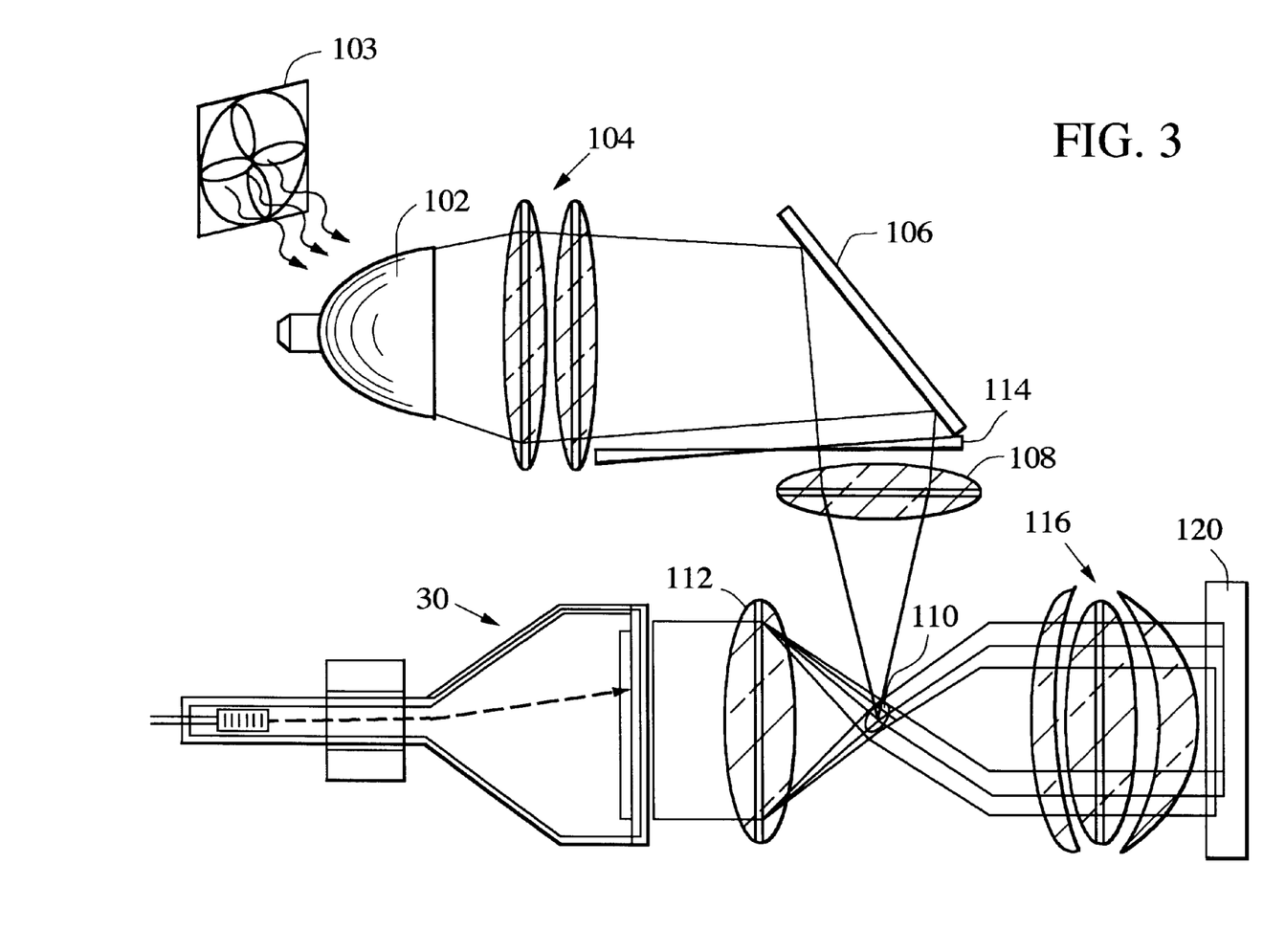
FIG. 3 is a schematic diagram of a color sequential CCM projection display.

As shown in FIG. 3, a projection display 100 includes a bright light source 102 such as an arc lamp with a reflector and a cooling fan 103. The arc lamp produces divergent light, which is collimated by collection optics 104, selected to absorb the ultraviolet component of the light. A cold mirror 106 passes the infrared component of the light and directs the collimated "cold" light to a condenser lens 108, which focuses the collimated light onto a turning mirror/Schlieren stop 110. The turning mirror redirects the now diverging light onto a field lens 112, which recollimates the light and images it onto a CRT-CCM imager 30, or alternately a thin-CCM imager. A color display can be implemented by positioning an color wheel 114 between cold mirror 106 and lens 108. This is commonly referred to as color sequential. The color wheel is typically RGB but could be Cyan and Magenta.

CRT-CCM imager 30, in response to a video addressing signal, imparts a spatial modulation onto the light in proportion to the amplitude of the deflection of the individual micromirrors. The spatially modulated light passes back through field lens 112 where it is focused onto a plane that extends through turning mirror/Schlieren stop 110. The Schlieren stop converts the spatially modulated beam into an intensity modulated beam that is then passed through a projection lens 116, which collimates the intensity modulated light and images it onto a screen 120.

The optical system just described can be reconfigured in several ways. For example, cold mirror 106 can be integrated with turning mirror 110. In addition, collection optics 104 and condenser lens 108 can be eliminated by using an elliptical reflector in the arc lamp rather than a parabolic reflector. Also, the turning mirror/Schlieren stop can be separated into two distinct components.

Figure 4:
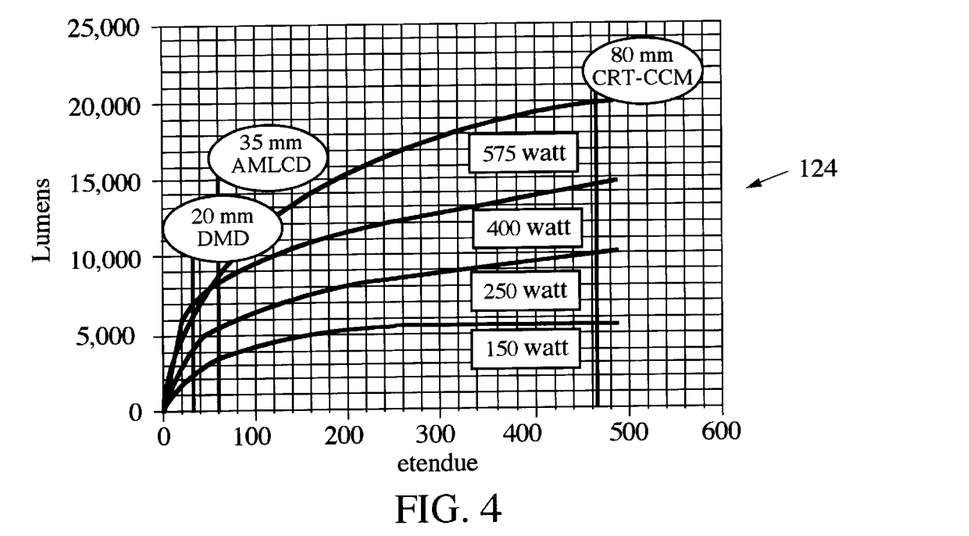
FIG. 4 is a plot of lumens vs. etendue.

Although there are various performance comparisons that can be made between the CCM, DMD, and AMLCD, the most compelling is brightness (lumens) and lumens per dollar. These measures are effected by each device's ability to collect light, its optical throughput, and manufacturing cost. Collection efficiency is determined by the so called étendue effect, which is related to the size of an arc lamp with respect to the size of the imager. Simply put, small imagers do not collect light efficiently. Even more to the point, small imagers are very inefficient when used in combination with the higher output lamps (larger source size lamps) that are required to produce very bright projection displays. Due to the design simplicity and large area flat-panel manufacturing, the CCM faceplate can be quite large, 6 to 10 inches across. Both AMLCD and DMD inherently suffer from small size, 1 to 2 inches across. As shown in the plot 124 of lumens versus etendue in FIG. 4, the 80 mm CRT-CCM is more efficient than the 35 mm AMLCD and 25 mm DMD and exhibits a tremendous advantage when used with a typical 575-watt lamp preferred for use in Boardroom class projectors.

Furthermore because the CCM imager has a large aperture it can be used in conjunction with arc lamps that have arc sizes 2–3 times those used in DMD and other reflective imagers, preferably greater than 5 mm. These larger arc lamps such as metal halide lamps exhibit longer lifetimes and are much cheaper than smaller arc lamps such as xenon lamps. This significantly improves the performance and cost of the overall projection display.

Figure 5:
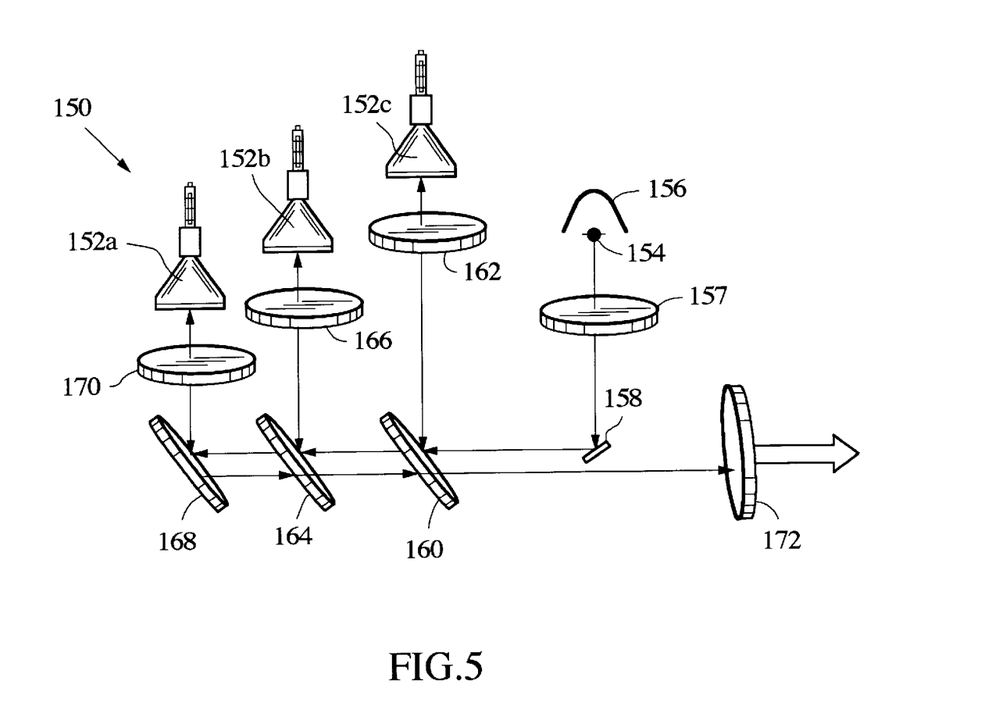
FIG. 5 is a schematic diagram of a three imager RGB projection display.

As shown in FIG. 5, the projection subsystem 150 for a large venue display is comprised of three CCM imagers 152a, 152b and 152c with associated yokes and CRT drive electronics that correspond to red, green and blue, respectively. An arc lamp 154 and reflector 156 emit white light that is focused by a collection lens 157 onto a turning mirror/Schlieren stop 158. The turning mirror redirects the now diverging light onto a dichroic recombiner 160, which reflects blue light to a field lens 162 where the light is recollimated and imaged onto membrane-actuated CCM imager 152c. The remaining light passes through recombiner 160 to a second dichroic recombiner 164, which reflects green light to a field lens 166 where the light is recollimaged and imaged onto CCM imager 152b. The remaining red light is reflect off of a mirror 168 to a field lens 170 where the light is recollimaged and imaged onto CCM imager 152a.

The imagers, in response to the red, green and blue components of a video addressing signal, impart a spatial modulation onto the respective RGB components of the light in proportion to the amplitude of the deflection of the individual micromirrors. The spatially modulated red light is reflected back off mirror 170 and passes through recombiners 164 and 160. The modulated green light is reflected off recombiner and passes through recombiner 160 and the modulated blue light is reflected off recombiner 160. The modulated red, green and blue components are focused onto a plane that extends through turning mirror/Schlieren stop 158. The Schlieren stop converts the spatially modulated beams into intensity modulated beams that are then passed through a projection lens 172, which collimates the light and images it onto a screen.

Figure 6:
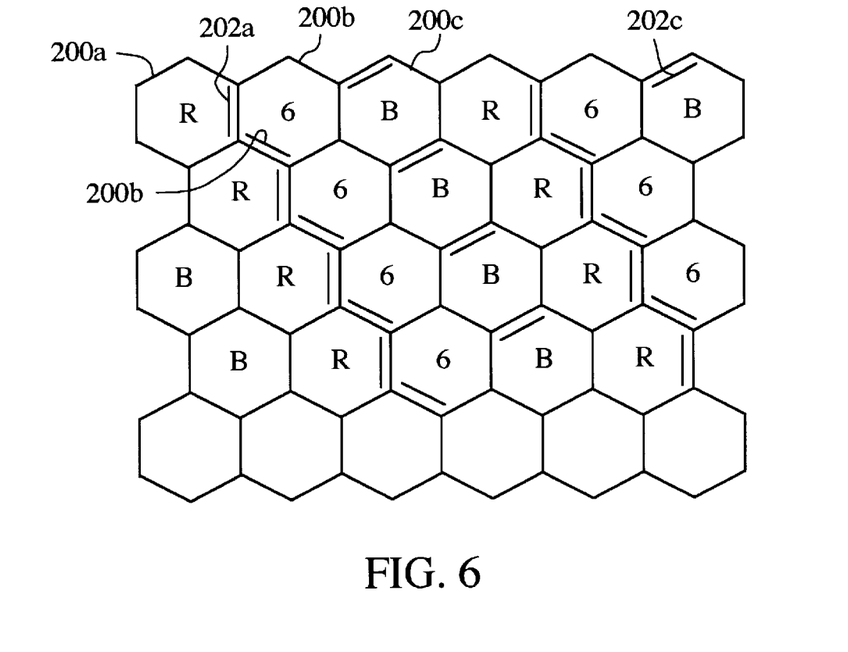
FIG. 6 is a diagram illustrating a hexagonal mirror configuration for a single RGB CCM imager.
Figure 7A:
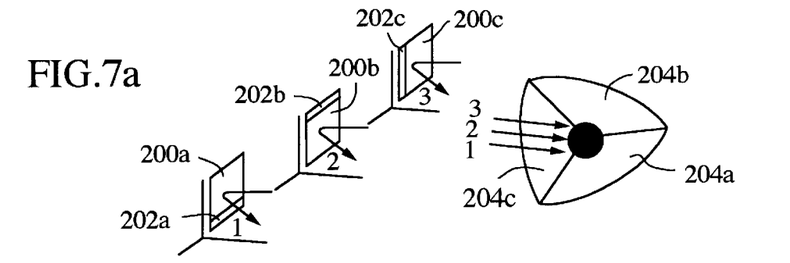
FIGS. 7a and 7b are diagrams illustrating an integrated Schlieren stop and RGB filter for a single RBG imager projection system.
Figure 7B:
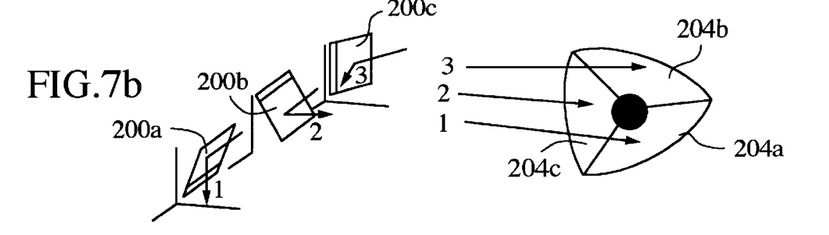
Figure 8:
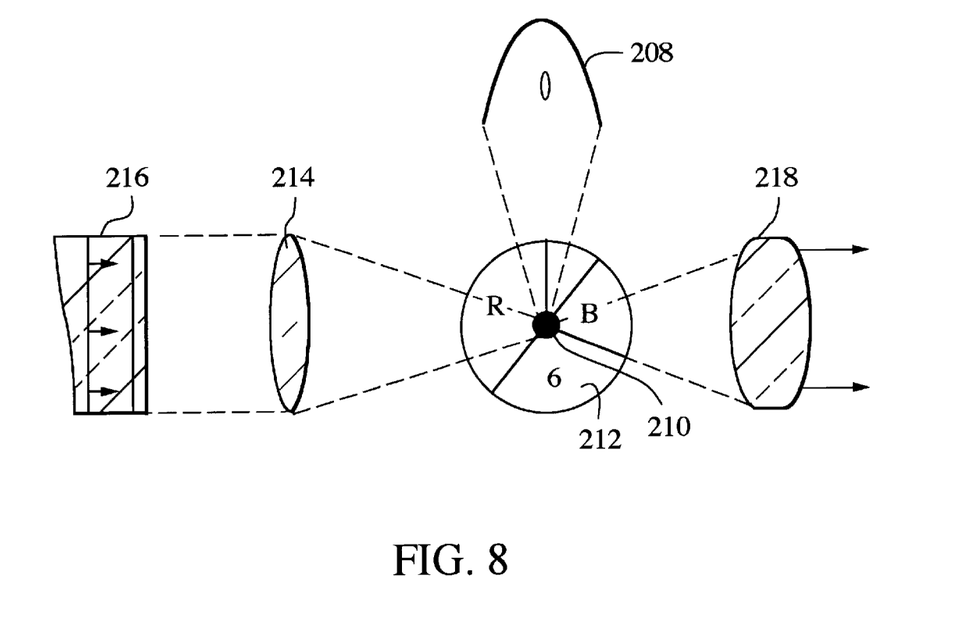
FIG. 8 is a schematic diagram of a single imager RGB projection display.

Although the three-imager configuration will provide maximum brightness, it may be too bulky and expensive for some applications. As shown in FIGS. 6–8, a single imager may be configured to produce a color display. As shown in FIG. 6, the imager has three mirrors 200a, 200b and 200c for each pixel. The mirrors have hinges 202a, 202b and 202c that are positioned on three different axes, in this case 120° apart. As shown in FIGS. 7a and 7b, the mirrors that are designated "R" reflect light into a red color filter 204a, those designated "B" reflect light into a blue filter 204b, and those designated "G" into a green filter 204c. A dark pixel reflects all of its light into a central stop 206. Intensity levels are generating by tilting the mirrors in such a way as to have some of the rays pass through the color filter and some of rays be intercepted and absorbed by the central stop.

As shown in FIG. 8, an arc lamp 208 with an elliptical reflector focuses light onto a turning mirror/Schlieren stop 210 that is integrated with an RGB filter 212. The turning mirror redirects the now diverging light onto a field lens 214, which recollimates the light and images it onto an RGB imager 216. Imager 216 imparts a spatial modulation onto the light in proportion to the amplitude of the deflection of the red, green and blue mirrors in each image pixel. The spatially modulated light passes back through field lens 214 where it is focused onto the plane that extends through the Schlieren stop. The Schlieren stop and color filter together convert the spatially modulated beam into intensity modulated red, green and blue beams that are optically recombined and then passed through a projection lens 218.

Figure 9:
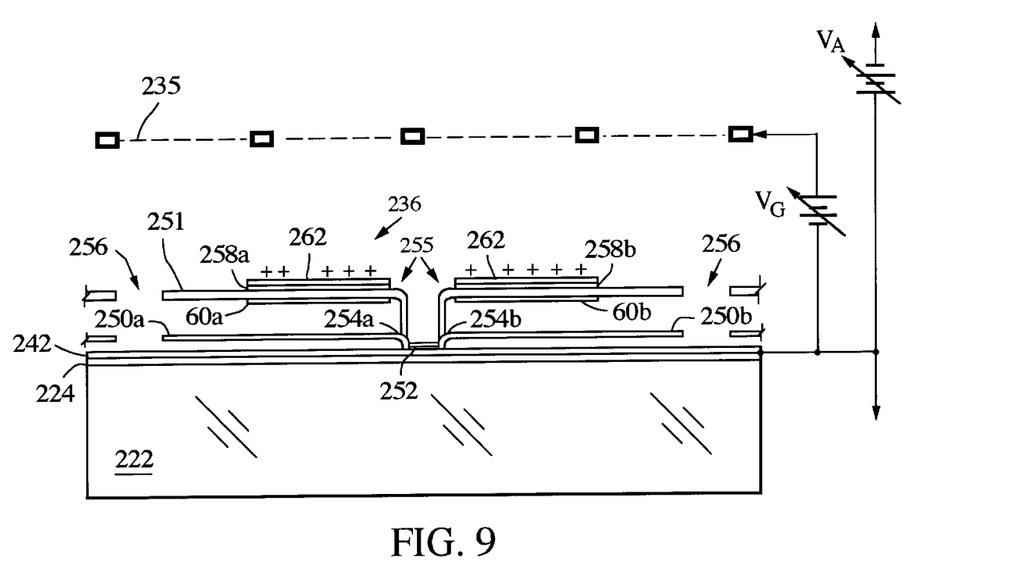
FIG. 9 is a sectional view of a currently preferred embodiment of a membrane actuated CCM with a cloverleaf mirror structure and perforated membrane.
Figure 10:
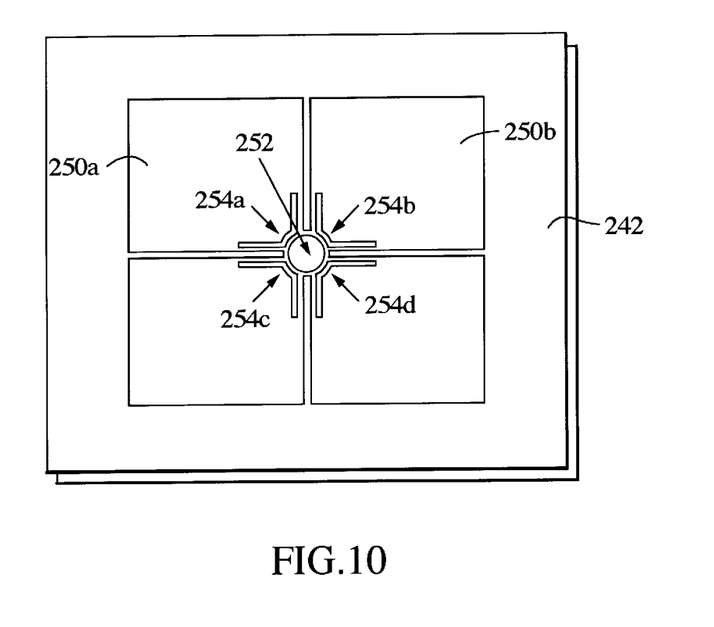
FIG. 10 is a plan view of the cloverleaf mirror structure with a common central post shown in FIG. 9.
Figure 11:
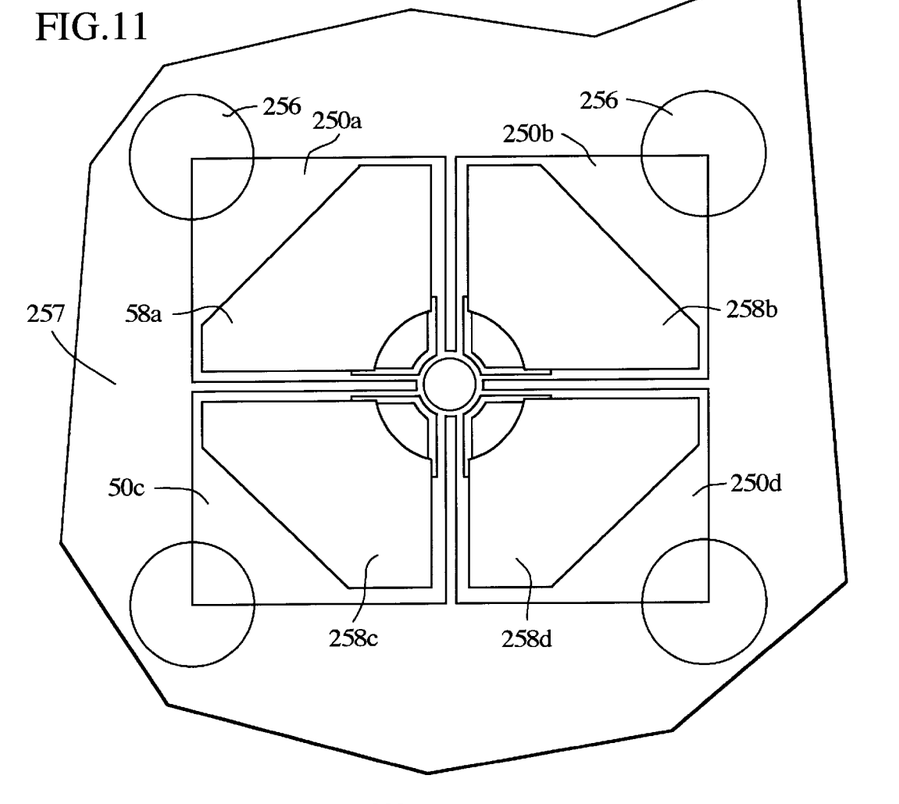
FIG. 11 is a plan view of the perforated membrane and attractor pad configuration.

A currently preferred embodiment of the membrane-actuated CCM is depicted in FIGS. 9, 10 and 11. In this configuration the mirror layer is patterned in a cloverleaf array of four centrally joined cantilever beams (or mirrors) 250a, 250b, 250c and 250d that share a common post region 252. The mirror layer is also patterned to define torsional flexion hinges 254a, 254b, 254c and 254d that join the respective cantilever beams to post region 252. Although other hinge designs are available, the torsional hinge is preferred because it gives higher compliance for a given fill factor.

The posts and membrane 257 are formed as an integral gull-wing shaped structure 255 in which the posts are located on the mirror's common post region 252. The membrane has a number of vent holes 256 that are spaced between cloverleaf arrays and used during processing to simultaneously release the micromirrors and membrane. This configuration allows the post to be relatively large in diameter with a smaller aspect ratio, which is desirable for fabrication considerations, without significantly reducing fill factor. Other single or multi-petal configurations are certainly within the scope of the invention. For example, the color display depicted in FIG. 8 uses three petal RGB structures.

Top attractor pads 258a, 258b, 258c and 258d are patterned on top of the membrane to lie directly above the respective cantilever beams 250a, 250b, 250c and 250d. As shown, the diagonal of the attractor pads is approximately 60% of that of the underlying cantilever beam. This allows the cantilever beam to be deflected tp approximately 83% of the mirror-to-membrane spacing without snap-over. To enhance charge efficiency, the top attractor pads are coated with a secondary emission material 262 that exhibits an emission coefficient greater than one at the desired beam energy. As illustrated, the four attractor pads are electrically isolated from one another. As a result, each cloverleaf structure represents four distinct pixels. In some applications it may be desirable to short the attractor pads together and treat each cloverleaf structure as a single pixel. This defines a larger pixel that is easier for the beam to address.

In the preferred configuration, a conductive grid 240, which includes post pads 226, is formed on a very thin transparent equipotential layer 242, suitably 100 ÅA or less of transparent conducting film or oxide (TCF or TCO) on substrate 222, which is coated with a passivation layer 224. Layer 242 prevents a potential difference from being developed between the mirrors and substrate that could otherwise cause instability. Grid 240 ensures electrical continuity between all of the micromirrors and holds them all at reference potential, suitably anode potential. Layer 242 could perform both functions, but would have to be much thicker to ensure electrical continuity, which would reduce optical efficiency.

To write a charge pattern 236 onto micromirrors 250, the source emits primary electrons that are accelerated by the anode potential $V_A$ through collector grid 235 and strike the backside of membrane 257 causing secondary electrons to be ejected and collected by the collector grid. The source is operated at a beam energy at which the number of secondaries ejected is different than the number of incident primaries. Suitably, the membrane is coated with a secondary emission material such as MgO that exhibits an emission coefficient, i.e. the ratio of emitted secondary electrons to incident primary electrons, much larger than unity at the beam energy. This reduces the amount of beam current that is required to write charge pattern 236 onto membrane 257. Note, the attractor pads could be formed by patterning the MgO coating.

The deposition of charge pattern 236 onto membrane 257, specifically attractor pads 258, modulates the potential of each pixel with respect to the erase potential. With the coated membrane, charge pattern 236 exhibits a net positive charge that increases the localized membrane potentials with respect to the mirror array's erase state potential. This in turn increases the electric field between the membrane and the micromirror and produces attractive forces that tend to pivot and deflect the mirrors 250 outward away from substrate 222 and towards the membrane. The attractive force is opposed by the hinge's spring force and the amount of deflection is determined by the force rebalance equation for a given geometry. The mirror deflection in turn imparts a modulation onto a beam of light.

In general, the more deposited charge, the stronger the electric field and the larger the deflection. Should the potential difference between the membrane and the micromirror exceed the snap-over threshold potential, which is determined by the mirror geometry and hinge compliance, the mirror will snap-over and contact the membrane, possibly becoming stuck to the membrane. Snap-over can be avoided by providing a relatively large mirror-to-membrane spacing and using only a fraction of the available deflection range or by biasing the collector grid potential $+V_G$, which determines an upper bound on the membrane potential, below the threshold potential such that $V_G+V_B<$Vth $V_B$ represents a safety margin to account for the fact that the membrane potential may slightly exceed $+V_G$ due to the low energy spectrum of the secondary electrons and the electrode geometry or due to variation in the output of the $V_G$ source, i.e. noise.

A number of techniques are available to erase charge pattern 236 from membrane 257. As mentioned above, the membrane potential is brought to some erase potential so that all of the pixels have the same potential and deflection. For example, the membrane potential could be returned to its floating potential equilibrium by allowing the charge to bleed off. The entire collector grid or segments thereof can be switched to anode potential and scanned thereby driving the membrane potential to the anode potential. If the mirror array is held at anode potential, the mirrors will be erased to their neutral position. Conversely if the mirror array is held at grid potential, the mirrors will be erased to their maximum deflected state. Furthermore, a pair of guns, operating at energies where the coated membrane's secondary emission coefficients are respectively greater than and less than unity, can be used to first drive the membrane potential to the erase potential to erase the charge pattern and then selectively adjust the pixel potentials to rewrite a new charge pattern. This same effect can be realized by forming a control pad on each pixel having the opposite electron affinity and then scanning the membrane with a single gun.

In this CCM configuration, the thickness of substrate 222, membrane 257 and mirrors 250 are selected to perform different functions. Assuming substrate 222 defines the cell's faceplate, its thickness must provide enough strength to hold off atmospheric pressure. A thickness of 3–5 mm is common. Since the mirrors are decoupled from the beam they can be made extremely thin, 2000–3000 Angstroms thick, and simultaneously with the hinges. As mentioned previously, this can improve reflectivity and reduces the force required to deflect the mirror due to high hinge compliance.

Membrane 257 must be at least thick enough to stop the incident electrons from penetrating through to the micromirrors and resilient enough to resist being torn off the post array. Typically, membrane materials of interest require about 1000 Angstroms per kilovolt of beam energy to stop electrons, where beam energies of 5–10 Kv are reasonable. However, as discussed above, a thin membrane is desirable to improve charge efficiency and maintain resolution as well as for cost and fabrication reasons. A membrane thickness of one to two microns seems to provide a reasonable balance, although thinner membranes would be preferred. Note, unlike Warde's CTP, membrane 257 is so thin that it cannot support itself against the applied electric field due to the induced charge pattern much less hold off atmospheric pressure.

While several illustrative embodiments of the invention have been shown and described, numerous variations and alternate embodiments will occur to those skilled in the art. For example, the equipotential layer can be patterned so that the mirrors can be biased downward by a buried layer that is held at a reference potential. Such variations and alternate embodiments are contemplated, and can be made without departing from the spirit and scope of the invention as defined in the appended claims.

We claim:

1. A projection display, comprising:
   a light source that emits light;
   a turning mirror that redirects the light;
   a field lens that collimates the light;
   a large aperture reflective imager that imparts a spatial modulation onto the collimated light, said spatially modulated light being reflected back through said field lens where it is focused onto a plane, said imager comprising
   a vacuum cell;
   a charge controlled mirror (CCM) mounted in said vacuum cell, comprising,
     a glass substrate;
     a transparent equipotential layer on said glass substrate;
     an array of electrostatically-actuable micromirrors on said equipotential layer that are both held at an reference potential;
     an array of insulating posts on said substrate;
     a floating-potential insulating membrane supported by said posts above said array of micromirrors; and
     a collector grid spaced apart from said insulating membrane opposite said micromirrors and held at a grid potential; and
   a source that emits primary electrons that are accelerated through said collector grid and strike portions of said insulating membrane above respective micromirrors causing secondary electrons to be ejected and collected on the collector grid thereby leaving a predetermined charge pattern on said membrane that produces finely-resolved attractive electrostatic forces that cause said micromirrors to pivot and deflect towards the membrane thereby imparting said spatial modulation onto said collimated light;
   a Schlieren stop at said plane that converts the spatially modulated beam into an intensity modulated beam; and
   a projection lens that collimates the intensity modulated light to form an image.

2. The projection display of claim 1, wherein said light source comprises an arc lamp having an arc of at least 5 mm.

3. The projection display of claim 2, wherein said light source is a metal halide lamp.

4. The projection display of claim 1, wherein said turning mirror and said Schlieren stop are a single integrated structure.

5. The projection display of claim 1, further comprising a color wheel.

6. The projection display of claim 1, wherein said imager comprises at least three micromirrors per image pixel that correspond to red, green and blue, said display further comprising an RGB filter that filters the intensity modulated light from said red, green and blue micromirrors, respectively.

7. The projection display of claim 6, wherein said three micromirrors per image pixel on hinged on three different axes approximately 120° apart.

8. The projection display of claim 6, wherein said RGB filter circumscribes said Schlieren stop.

9. The projection display of claim 1, wherein said light is split into a plurality of color components, said projection display comprising a like plurality of said large aperture reflective imagers that spatially modulate the respective color components.

10. The projection display of claim 1, wherein said imager further comprises an array of attractor pads on the backside of said membrane that are aligned with said array of micromirrors, said source writing said charge pattern onto said attractor pads such that each micromirror's charge is distributed approximately uniformly across the corresponding attractor pad.

11. The projection display of claim 1, wherein said charge pattern increases the localized membrane potentials toward the grid potential so that the potential differences between the membrane and the micromirrors produces the finely-resolved attractive electrostatic forces, said micromirrors being susceptible to snap-over when the potential difference exceeds a threshold potential, said collector grid being biased so that said grid potential is less than said threshold potential.

12. The projection display of claim 1, wherein said array of micromirrors is configured with cloverleaf arrays of four centrally joined cantilever beams that share common post regions on said equipotential layer.

13. The projection display of claim 12, said imager further comprising an array of attractor pads on the backside of said membrane that are aligned with said cantilever beams.

14. The projection display of claim 13, wherein said array of attractor pads includes one said attractor pad per cantilever beam.

15. The projection display of claim 12, wherein said insulating posts are on said substrate in said common posts regions and formed integrally with said membrane.

16. A projection display, comprising:
a light source that emits light;
a tuning mirror that redirects the light;
a first optical component that reflects a first color component of said light and passes the remaining light;
a second optical component that reflects a second color component of the light passed by said first optical component and passes the remaining light;
a third optical component that reflect a third color component of the light passed by said second optical component;
a plurality of field lens that respectively collimate the first, second and third color components of light;
a plurality of large aperture reflective imagers that impart respective spatial modulations onto the collimated first, second and third color components of light, said spatially modulated components being reflected back through the respective field lenses and said third, second and first optical elements where said components are focused onto a plane, said imagers each comprising
a vacuum cell;
a charge controlled mirror (CCM) mounted in said vacuum cell, comprising, a glass substrate;
a transparent equipotential layer on said glass substrate;
an array of electrostatically-actuable micromirrors on said equipotential layer that are both held at an reference potential;
an array of insulating posts on said substrate;
a floating-potential insulating membrane supported by said posts above said array of micromirrors; and
a collector grid spaced apart from said insulating membrane opposite said micromirrors and held at a grid potential; and
a source that emits primary electrons that are accelerated through said collector grid and strike portions of said insulating membrane above respective micromirrors causing secondary electrons to be ejected and collected on the collector grid thereby leaving a predetermined charge pattern on said membrane that produces finely-resolved attractive electrostatic forces that cause said micromirrors to pivot and deflect towards the membrane thereby imparting said spatial modulation onto said collimated light;
a Schlieren stop at said plane that converts the spatially modulated components into intensity modulated beams; and
a projection lens that collimates the intensity modulated beams to form a color image.

17. The projection display of claim 16, wherein said light source comprises an arc lamp having an arc of at least 5 mm.

18. The projection display of claim 17, wherein said light source is a metal halide lamp.

19. The projection display of claim 16, wherein said turning mirror and said Schlieren stop are a single integrated structure.

20. The projection display of claim 16, wherein each said imager further comprises an array of attractor pads on the backside of said membrane that are aligned with said array of micromirrors, said source writing said charge pattern onto said attractor pads such that each micromirror's charge is distributed approximately uniformly across the corresponding attractor pad.

21. The projection display of claim 16, wherein said charge pattern increases the localized membrane potentials toward the grid potential so that the potential differences between the membrane and the micromirrors produces the finely-resolved attractive electrostatic forces, said micromirrors being susceptible to snap-over when the potential difference exceeds a threshold potential, said collector grid being biased so that said grid potential is less than said threshold potential.

22. The projection display of claim 16, wherein said array of micromirrors is configured with cloverleaf arrays of four centrally joined cantilever beams that share common post regions on said equipotential layer.

23. The projection display of claim 22, said imager further comprising an array of attractor pads on the backside of said membrane that are aligned with said cantilever beams.

24. The projection display of claim 23, wherein said array of attractor pads includes one said attractor pad per cantilever beam.

25. The projection display of claim 22, wherein said insulating posts are on said substrate in said common posts regions and formed integrally with said membrane.

26. A projection display, comprising:

a light source that emits light;

a turning mirror that redirects the light;

a field lens that collimates the light;

a large aperture reflective imager that imparts a red, green and blue spatial modulation onto the collimated light in response to the red, green and blue components of a video addressing signal, said spatially modulated light being reflected back through said field lens where it is focused onto a plane, said imager comprising a vacuum cell;

a charge controlled mirror (CCM) mounted in said vacuum cell, comprising, a glass substrate;

a transparent equipotential layer on said glass substrate;

an array of electrostatically-actuable hinged micromirrors on said equipotential layer that are both held at an reference potential, said micromirrors being configured so that each image pixel has at least a red, a green and a blue micromirror;

an array of insulating posts on said substrate;

a floating-potential insulating membrane supported by said posts above said array of micromirrors; and a collector grid spaced apart from said insulating membrane opposite said micromirrors and held at a grid potential; and a source that emits primary electrons that are accelerated through said collector grid and strike portions of said insulating membrane above respective micromirrors causing secondary electrons to be ejected and collected on the collector grid thereby leaving a predetermined charge pattern on said membrane that produces finely-resolved attractive electrostatic forces that cause said micromirrors to pivot and deflect towards the membrane thereby imparting said red, green and blue spatial modulation onto said collimated light;

a Schlieren stop at said plane that converts the spatially modulated beam into an intensity modulated beam;

a red, green and blue color filter that converts the intensity modulated beam into red, green and blue intensity modulated beams; and a projection lens that collimates the intensity modulated light to form a color image.

27. The projection display of claim 26, wherein said red, green and blue micromirrors are hinged on three different axis so that the spatially modulated light reflected off of the red, green and blue micromirrors passes through respective red, green and blue portions of the color filter.

28. The projection display of claim 27, wherein said color filter circumscribes said Schlieren stop.

29. The projection display of claim 26, where said light source is a metal halide lamp.

30. The projection display of claim 26, wherein said array of micromirrors is configured with cloverleaf arrays of four centrally joined cantilever beams that share common post regions on said equipotential layer.

31. The projection display of claim 30, said imager further comprising an array of attractor pads on the backside of said membrane that are aligned with said cantilever beams.

32. The projection display of claim 31, wherein said array of attractor pads includes one said attractor pad per cantilever beam.

33. The projection display of claim 30, wherein said insulating posts are on said substrate in said common posts regions and formed integrally with said membrane.

* * * * *